US012432750B2

United States Patent
Fakoorian et al.

(10) Patent No.: US 12,432,750 B2
(45) Date of Patent: Sep. 30, 2025

(54) ENHANCEMENT OF MESSAGE 3 FOR RACH PROCEDURE

(71) Applicant: Apple Inc., Cupertino, CA (US)

(72) Inventors: Seyed Ali Akbar Fakoorian, San Diego, CA (US); Amir Gohari, Sunnyvale, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/754,450

(22) PCT Filed: Apr. 6, 2021

(86) PCT No.: PCT/CN2021/085725
§ 371 (c)(1),
(2) Date: Apr. 1, 2022

(87) PCT Pub. No.: WO2022/213285
PCT Pub. Date: Oct. 13, 2022

(65) Prior Publication Data
US 2024/0049288 A1    Feb. 8, 2024

(51) Int. Cl.
*H04W 74/0833*    (2024.01)
*H04L 5/00*    (2006.01)
(Continued)

(52) U.S. Cl.
CPC ....... *H04W 74/0833* (2013.01); *H04L 5/0012* (2013.01); *H04W 48/08* (2013.01); *H04W 72/1268* (2013.01); *H04W 72/232* (2023.01)

(58) Field of Classification Search
CPC .......... H04W 74/0833; H04W 72/232; H04W 72/1268; H04W 48/08; H04L 5/0012
See application file for complete search history.

(56) References Cited

U.S. PATENT DOCUMENTS

| 2018/0205522 A1 | 7/2018 | Wang et al. |
| 2021/0076384 A1 | 3/2021 | MolavianJazi et al. |

(Continued)

FOREIGN PATENT DOCUMENTS

| CN | 106465428 | 2/2017 |
| CN | 107534971 | 1/2018 |

(Continued)

OTHER PUBLICATIONS

MCC Support "Final Report of 3GPP TSG RAN WGI #103-e v1.0.0", 3GPP TSG RAN WG1 Meeting #104-e, R1-2100001, Jan. 20, 2021, pp. 219-235, 24 sheets.

*Primary Examiner* — Elton Williams
(74) *Attorney, Agent, or Firm* — Fay Kaplun & Marcin, LLP

(57) ABSTRACT

A user equipment (UE) is configured to receive message 3 (Msg3) transmissions. The UE receives a system information block (SIB) transmission from a base station of a wireless network, receives a downlink control information (DCI) transmission scheduling a message 2 (Msg2) transmission from the base station, receives the Msg2 transmission including an uplink (UL) grant for a message 3 (Msg3) initial transmission from the base station, determines the number of repetitions for the Msg3 initial transmission based on at least one of the SIB transmission, the DCI transmission, and the Msg2 transmission and determines a (Continued)

frequency hopping (FH) type and FH pattern based on at least one of the SIB transmission, the DCI transmission, and the Msg2 transmission.

20 Claims, 6 Drawing Sheets

(51) Int. Cl.
    *H04W 48/08*         (2009.01)
    *H04W 72/1268*    (2023.01)
    *H04W 72/232*     (2023.01)

(56) References Cited

U.S. PATENT DOCUMENTS

| | | | |
|---|---|---|---|
| 2021/0152318 A1* | 5/2021 | Park | H04L 5/0057 |
| 2021/0195652 A1* | 6/2021 | Taherzadeh Boroujeni | ................ H04W 76/27 |
| 2021/0235503 A1* | 7/2021 | Irukulapati | H04L 1/08 |
| 2023/0262753 A1* | 8/2023 | Axnas | H04L 1/1822 370/329 |

FOREIGN PATENT DOCUMENTS

| | | |
|---|---|---|
| CN | 111919490 | 11/2020 |
| WO | 2018/203727 | 11/2018 |

\* cited by examiner

ENHANCEMENT OF MESSAGE 3 FOR RACH PROCEDURE

BACKGROUND

In 5G new radio (NR) wireless communications, a user equipment (UE) may perform a random access channel (RACH) procedure to connect to a 5G NR network. To improve reliability, some of the transmissions between the UE and a next generation Node-B (gNB) of the network may be transmitted with repetitions.

SUMMARY

Some exemplary embodiments are related to a processor of a user equipment (UE) configured to perform operations. The operations include receiving a system information block (SIB) transmission from a base station of a wireless network, receiving a downlink control information (DCI) transmission scheduling a message 2 (Msg2) transmission from the base station, receiving the Msg2 transmission including an uplink (UL) grant for a message 3 (Msg3) initial transmission from the base station, determining the number of repetitions for the Msg3 initial transmission based on at least one of the SIB transmission, the DCI transmission, and the Msg2 transmission, and determining a frequency hopping (FH) type and FH pattern based on at least one of the SIB transmission, the DCI transmission, and the Msg2 transmission.

Other exemplary embodiments are related to a processor of a base station configured to perform operations. The operations include transmitting a system information block (SIB) transmission to a user equipment (UE), transmitting a downlink control information (DCI) transmission scheduling a message 2 (Msg2) transmission from the base station and transmitting the Msg2 transmission including an uplink (UL) grant for a message 3 (Msg3) initial transmission from the base station, wherein the UE determines the number of repetitions for the Msg3 initial transmission based on at least one of the SIB transmission, the DCI transmission, and the Msg2 transmission, and wherein the UE determines a frequency hopping (FH) type and FH pattern based on at least one of the SIB transmission, the DCI transmission, and the Msg2 transmission.

Still further exemplary embodiments are related to a user equipment (UE) having a transceiver configured to communicate with a network, and a processor communicatively coupled to the transceiver and configured to perform operations. The operations include receiving a system information block (SIB) transmission from a base station of a wireless network, receiving a downlink control information (DCI) transmission scheduling a message 2 (Msg2) transmission from the base station, receiving the Msg2 transmission including an uplink (UL) grant for a message 3 (Msg3) initial transmission from the base station, determining the number of repetitions for the Msg3 initial transmission based on at least one of the SIB transmission, the DCI transmission, and the Msg2 transmission, and determining a frequency hopping (FH) type and FH pattern based on at least one of the SIB transmission, the DCI transmission, and the Msg2 transmission.

Additional exemplary embodiments are related to a base station comprising a transceiver configured to communicate with a user equipment (UE), and a processor communicatively coupled to the transceiver and configured to perform operations. The operations include transmitting a system information block (SIB) transmission to a user equipment (UE), transmitting a downlink control information (DCI) transmission scheduling a message 2 (Msg2) transmission from the base station, and transmitting the Msg2 transmission including an uplink (UL) grant for a message 3 (Msg3) initial transmission from the base station, wherein the UE determines the number of repetitions for the Msg3 initial transmission based on at least one of the SIB transmission, the DCI transmission, and the Msg2 transmission, and wherein the UE determines a frequency hopping (FH) type and FH pattern based on at least one of the SIB transmission, the DCI transmission, and the Msg2 transmission.

DETAILED DESCRIPTION

Figure 1:
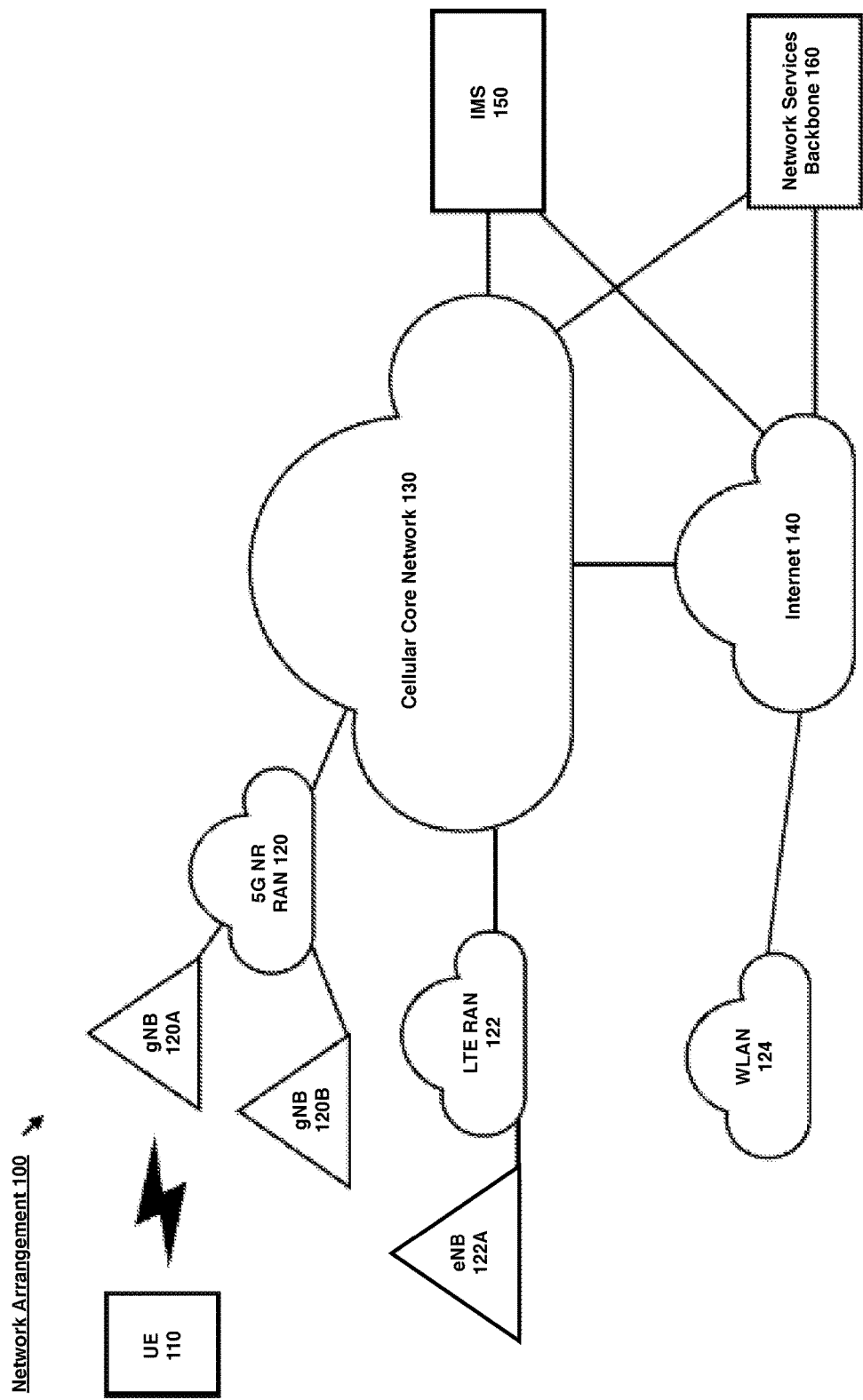
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) receiving a Message 3 (Msg3) configuration which includes a number of repetitions and frequency hopping (FH) parameters.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

During a UE's initial registration with a 5G NR network, a next generation NodeB (gNB) of the network configures the UE with Msg3 parameters. Releases 15 and 16 of 3GPP support an indication of whether or not FH is supported for Msg3. However, Msg3 repetitions (both initial transmission and retransmissions), and consequentially, inter-slot FH are not supported.

According to the exemplary embodiments, after the UE has transmitted a random access channel (RACH) request to the gNB to initiate the registration process, the UE receives a downlink control information (DCI) transmission scheduling a Message 2 (Msg2) transmission. The DCI may include an indication of the number of repetitions of the initial Msg3 transmission. In addition, the DCI scheduling the Msg2 and/or the Msg2 may also include an indication of a FH type and pattern.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
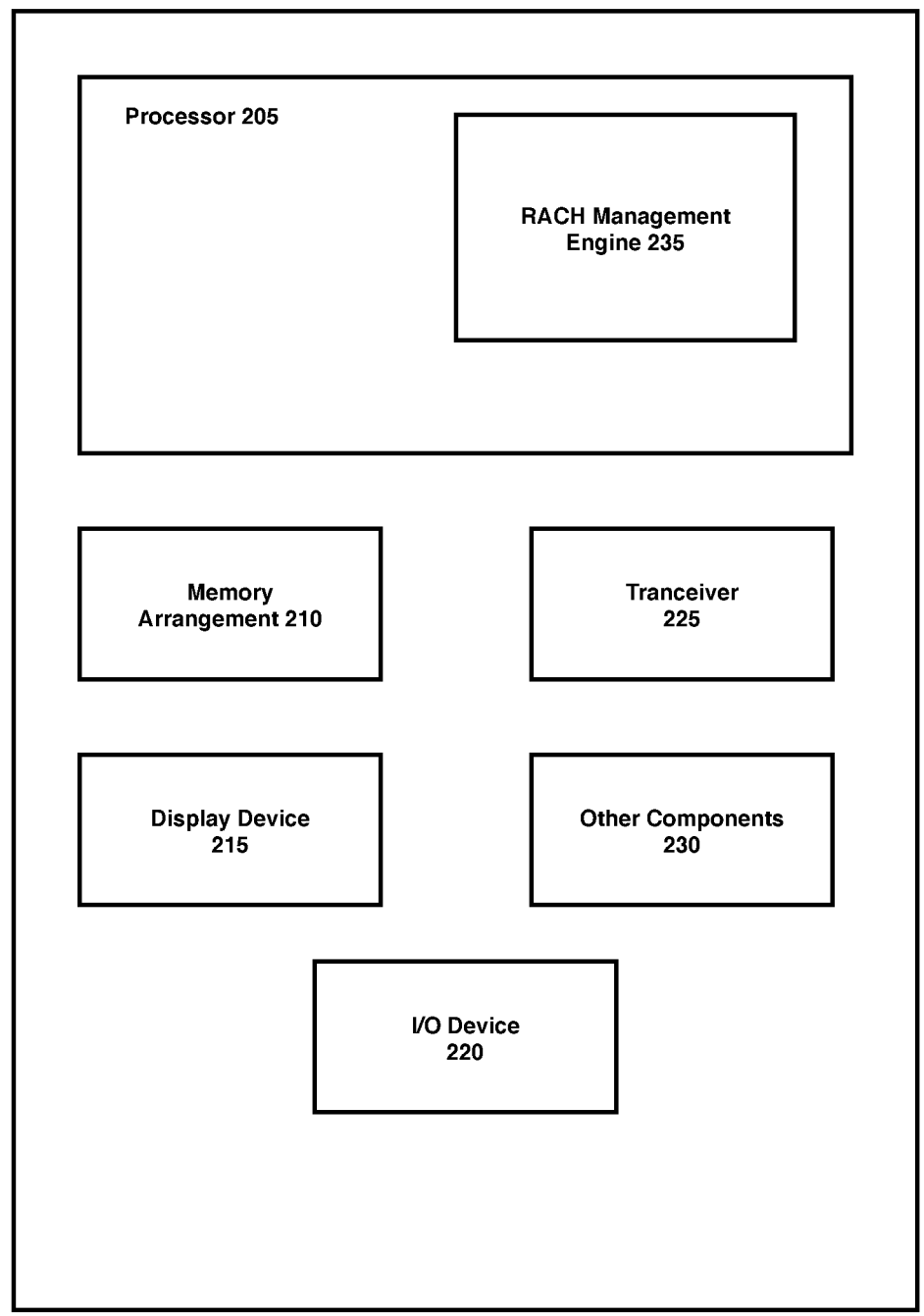
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a RACH management engine 235. The RACH management engine 235 may perform various operations related to receiving a Msg3 configuration including a number of repetitions and FH parameters.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
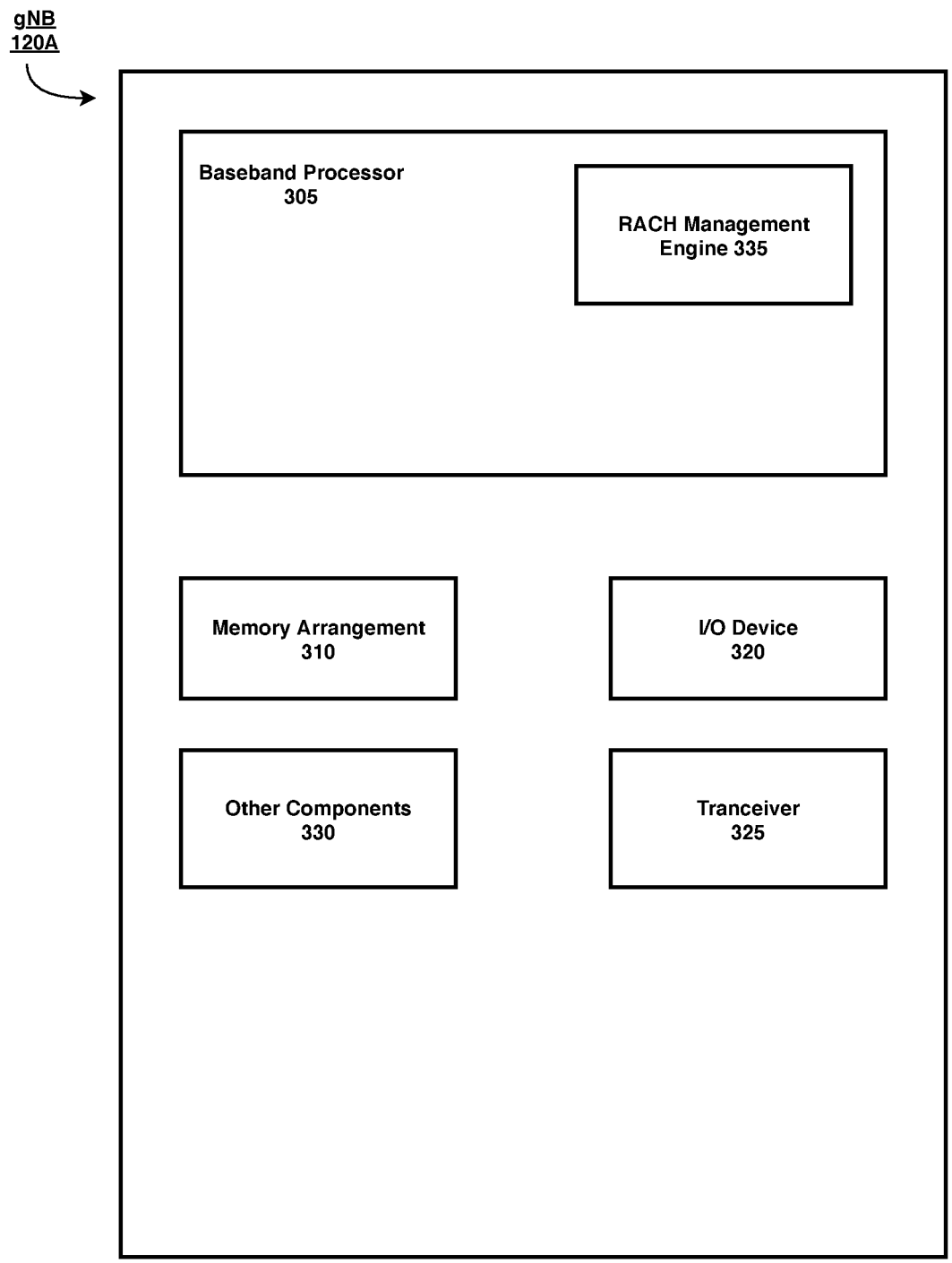
FIG. 3 shows an exemplary base station according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a RACH management engine 335 for performing operations including configuring a number of repetitions and FH parameters for Msg3 transmission(s) by the UE 110. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4A:
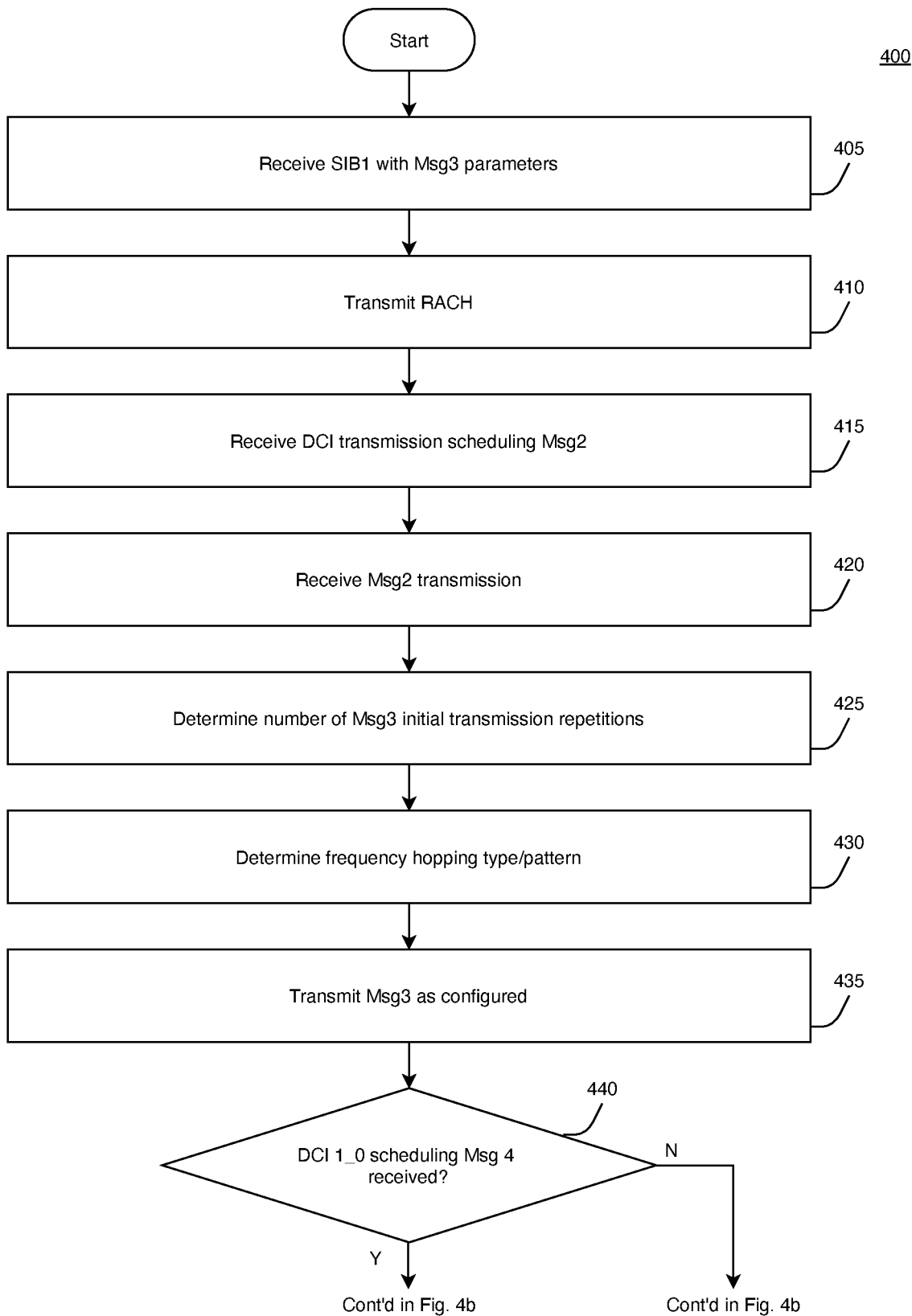
FIGS. 4A and 4B show a method of configuring message 3 (Msg3) parameters according to various exemplary embodiments.
Figure 4B:
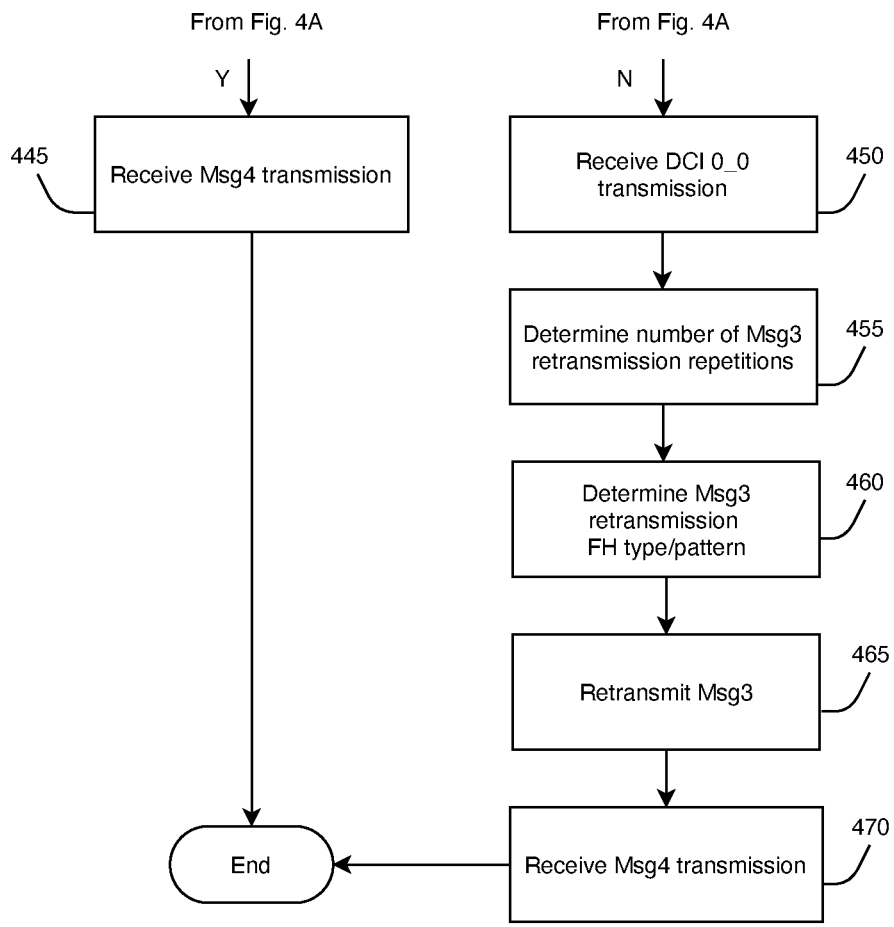

FIGS. 4A and 4B show a method 400 of configuring message 3 (Msg3) parameters according to various exemplary embodiments. The method 400 configures repetitions and FH parameters for a Msg3 initial transmission and/or retransmission. At 405, the UE 110 receives a system information block 1 (SIB1) from the gNB 120A (or 120B). In some exemplary embodiments, the SIB1 includes a set of repetition numbers having a set size A, from which the gNB 120A will later indicate an entry to indicate a number of repetitions for a Msg3 initial transmission. At 410, the UE 110 sends a random access channel (RACH) transmission to the gNB 120A to begin the registration process. In some embodiments, the RACH resources selected by the UE 110 for the RACH transmission indicate to the gNB 120A whether or not the UE 110 supports Msg3 repetitions. The following description assumes that the UE 110 supports Msg3 repetitions.

At 415, the UE 110 receives a DCI transmission (DCI format 1_0) over the physical downlink shared channel (PDSCH) scheduling a Msg2 transmission. It should be noted that any reference to Msg2 in the following description is also applicable to a MsgB transmission in a two-step RACH procedure. For example, any reference to bits of the Msg2 transmission or the UL grant of Msg2 may alternatively be bits of a MsgB transmission or the UL grant of a MsgB.

In some exemplary embodiments, a number B of reserved bits of the DCI 1_0 with cyclic redundancy check (CRC) scrambled by random access radio network temporary identifier (RA-RNTI) (or by MsgB-RNTI) used to indicate the number of Msg3 initial transmission repetitions from the set A in the SIB1. In some exemplary embodiments, the B reserved bits are the bits immediately after a transport block (TB) scaling field or least significant bits (LSB) of the system frame number (SFN), if applicable. To determine B, the following equation may be used:

$$B = \text{floor}(\log 2(A))$$

At 420, the UE 110 receives the Msg2 transmission from the gNB 120A. Among other purposes, the Msg2 provides the uplink (UL) grant for the Msg3 transmission to be sent by the UE 110. In addition to a 1-bit reserved field, the Msg2 medium access control (MAC) control element (CE) typically includes a timing advance command field, a UL grant field, and a temporary cell RNTI (C-RNTI) field. The UL grant field is typically made up of 27 bits, which include a 1-bit FH hopping flag field, a 14-bit physical uplink shared channel (PUSCH) frequency domain resource allocation (FDRA) field, a 4-bit PUSCH time domain resource allocation (TDRA) field, a 4-bit modulation and coding scheme (MCS) field, a 3-bit transmission power control (TPC) command for PUSCH field, and a 1-bit channel state information (CSI) request field.

In some exemplary embodiments, the Msg2 reserved field and/or some of the bits of the UL grant in the Msg2 may be used to dynamically indicate the number of repetitions of the Msg3 initial transmission. For example, in some exemplary embodiments, because the initial UL bandwidth part (BWP) is limited to 20 MHz, a maximum of 11 bits is sufficient for the PUSCH FDRA. The remaining 3 bits of the FDRA may alternatively be used to indicate the number of repetitions of the Msg3 initial transmission.

In some embodiments, because repetitions are required, not all 4 bits of the MCS are needed. As such, the one or more bits that are not needed may alternatively be used to indicate the number of repetitions of the Msg3 initial transmission. In some embodiments, because the CSI from the UE 110 may not be very reliable (since repetitions are used), the 1 bit CSI may alternatively be used to indicate the number of repetitions of the Msg3 initial transmission. In some embodiments, a combination of the above repurposed bits may be used to indicate the number of repetitions of the Msg3 initial transmission. The repurposed bits from these fields are used to indicate the number of Msg3 initial transmission repetitions from the set A in the SIB1, as described above.

In some exemplary embodiments, to indicate an initial BWP of up two 20 MHz for coverage-limited UEs (e.g., reduced capability UEs) when the initial UL BWP is greater than 20 MHz, the resource block (RB) numbering for the initial UL BWP of a coverage-limited UE starts from the first RB of the initial UL BWP defined by the gNB 120A, and the maximum number of RBs for FDRA is equal to the number of RBs associated with the BWP size limit for a coverage enhanced UE, (e.g. 50 for SCS=30 kHz and BWP=20 MHz). In other exemplary embodiments, to indicate an initial BWP of up two 20 MHz for coverage-limited UEs (reduced capability UEs) when the initial UL BWP is greater than 20 MHz, the initial uplink BWP for a coverage-limited UE may be in the middle of the initial BWP defined by the gNB 120A.

In some exemplary embodiments, the reserved bit of the Msg2 MAC CE indicates how the UL grant of the Msg2 should be interpreted. In some embodiments, a reserved bit of the DCI (DCI 1_0 with CRC scrambled by RA-RNTI or by MsgB-RNTI) that schedules the Msg2 transmission may alternatively indicate how the UL grant of the Msg2 should be interpreted. In either scenario, a first value (e.g., 0) indicates that the UL grant is a legacy UL grant (e.g., Release 15/16), meaning no Msg3 initial transmission repetitions are supported. Conversely, a second value (e.g., 1) indicates that the UL grant is a new UL grant (e.g., Release 17), meaning Msg3 initial transmission repetitions are supported.

At 425, the UE 110 determines the number of Msg3 repetitions based on any one or more of the above exemplary embodiments. At 430, the UE 110 determines a frequency hopping (FH) type and pattern for the repetitions of the Msg3 initial transmission.

In some exemplary embodiments, if the reserved bit of the Msg2 MAC CE or the DCI that schedules the Msg2 indicates that the UL grant in the Msg2 is a new UL grant, then the UE 110 determines a FH type and pattern from the repurposed UL grant bits described above. For example, the three (3) most significant (or least significant) bits of the FDRA (out of the typical 14 bits) in addition to the single bit for the FH flag may be used to indicate the number of Msg3 initial transmission repetitions and the FH type. For example, if the FH flag has a first value (e.g., 0), then no FH is supported and all 3 bits of the FDRA are mapped to indicate the number of repetitions (based on the set defined in SIB1 as described above). Conversely, if the FH flag has a second value (e.g., 1), then (i) FH is supported, (ii) 1 of the 3 bits of the FDRA may indicate whether the FH type inter-slot or intra-slot FH, and (iii) 2 out of the 3 bits of the FDRA indicate the number of repetitions (based on the set defined in SIB1 as described above). In some exemplary embodiments, other additional bits (e.g., MCS, CSI, etc. as described above) may also be used to provide additional flexibility such as, for example, indicating a FH pattern.

The additional bits of the UL grant may only indicate the number of repetitions of the Msg3 initial transmission. In such an embodiment, the FH type/pattern may implicitly be indicated as will be described in detail below.

In some exemplary embodiments, the type of FH (inter-slot or intra-slot) for an initial Msg3 transmission with repetitions may be explicitly indicated by some of the reserved bits of the DCI that schedules the Msg2 transmission (DCI 1_0 with CRC scrambled by RA-RNTI or by MsgB-RNTI). For example, one or more of the bits which are after the bits that indicate the number of repetitions may provide an explicit indication of inter-slot (e.g., value of 1 or 0) or intra-slot (e.g., value of 0 or 1) FH. In some embodiments, when this explicit indication is inter-slot FH, other reserved bits may indicate a FH pattern (e.g., every other repetition, after the first half of repetitions, etc.). In other exemplary embodiments, the FH pattern may be indicated by the SIB or by the reserved bit in the Msg2.

The type of FH for an initial Msg3 transmission with repetitions may be explicitly indicated by the reserved bit of the Msg2 in a similar manner as discussed above (a value of 0/1). In such an embodiment, the FH pattern may be indicated by the SIB.

In some exemplary embodiments, the type of FH for an initial Msg3 transmission with repetitions may be implicitly indicated. For example, it may always be assumed that a Msg3 initial transmission with repetitions allow FH. In these exemplary embodiments, the single bit FH flag in the UL grant of Msg2 (or the UL grant of a fallbackRAR) may be used to indicate the FH type (e.g., 0 for inter-slot FH, 1 for intra-slot FH, or vice versa). In other exemplary embodiments, it may alternatively always be assumed that a Msg3 initial transmission with repetitions allow FH and the FH type is always inter-slot FH, intra-slot FH, or indicated by the SIB. In these exemplary embodiments, the single bit FH flag in the UL grant of Msg2 (or the UL grant of a fallbackRAR) may alternatively be used to indicate the number of Msg3 initial transmission repetitions, as described above, or for some other purpose. In either of these embodiments, for inter-slot repetitions, the FH pattern may be indicated by the SIB or the reserved bit of Msg2. If the Msg3 initial transmission with repetitions always allows FH and the FH type is always inter-slot FH, then the single bit FH flag in the UL grant of Msg2 (or the UL grant of a fallbackRAR) may be used to indicate the FH pattern.

Returning to FIG. 4A, after the UE 110 determines the number of Msg3 initial transmission repetitions and the FH type and pattern, at 435, the UE 110 transmits the Msg3 initial transmission as configured. At 440, the UE 110 determines whether a DCI 1_0 scheduling a Msg4 transmission has been received. If the DCI 1_0 is received, this means that the gNB 120A has successfully decoded the Msg3 initial transmission. As such, the UE 110 receives the Msg4 transmission at 445, as shown in FIG. 4B.

If, however, if the DCI 1_0 has not been received, this means that the gNB 120A has failed to decode the Msg3 initial transmission. As such, the UE 110 receives a DCI 0_0 at 450, which schedules a Msg3 retransmission. In some exemplary embodiments, for Msg3 retransmission, the number or repetitions, the FH type, and the FH pattern may be explicitly indicated in the DCI 0_0 with a CRC scrambled by a TC-RNTI that schedules the Msg3 retransmission via a combination of the FH flag in the UL grant of the DCI 0_0 and some reserved bits of the DCI 0_0. For example, because the 1-bit new data indicator (NDI) field and the 4-bit hybrid automatic retransmission request (HARQ) process number (HPN) are not used for Msg3 retransmissions, these bits may be used to indicate the FH type (e.g., NDI set to 0 or 1 for inter-slot FH and 1 or 0 for intra-slot FH).

In other exemplary embodiments, the FH type for a Msg3 retransmission with repetitions may be implicitly indicated. For example, it may always be assumed that a Msg3 retransmission with repetitions always allows for FH. In these embodiments, the single bit FH flag in the UL grant of the DCI 0_0 may be used to indicate the FH type (e.g., 0 for inter-slot FH, 1 for intra-slot FH, or vice versa). In some exemplary embodiments, it may always be assumed that a Msg3 initial transmission with repetitions may always allow FH and the FH type is inter-slot FH, intra-slot FH, or indicated by the SIB. In these exemplary embodiments, the single bit FH flag in the UL grant of DCI 0_0 may be used to indicate the number of Msg3 initial transmission repetitions, as described above, or for some other purpose. In any of these embodiments, for inter-slot repetitions, the FH pattern may be indicated by the SIB or the reserved bit of DCI 0_0. If the Msg3 initial transmission with repetitions always allows FH and the FH type is always inter-slot FH, then the single bit FH flag in the UL grant of DCI 0_0 may be used to indicate the FH pattern.

In some exemplary embodiments, the FH type for a Msg3 retransmission with repetitions may be the same FH type as the Msg3 initial transmission. In other exemplary embodiments, the FH type for a Msg3 retransmission with repetitions may be the opposite FH type than the Msg3 initial transmission. In still further exemplary embodiments, the FH type for a Msg3 retransmission with repetitions may be indicated by the RACH occasion (RO) and/or the RACH preamble selected by the UE within a physical RACH (PRACH) transmission.

At 455, the UE 110 determines the number of repetitions for the Msg3 retransmission as described above. At 460, the UE 110 determines the Msg3 retransmission FH type and pattern as described above. At 465, the UE 110 retransmits the Msg3 with the repetitions, FH type, and FH pattern as described above. Assuming the gNB 120A successfully decodes the Msg3 retransmission, at 470, the UE 110 receives the Msg4 transmission.

Figure 5:
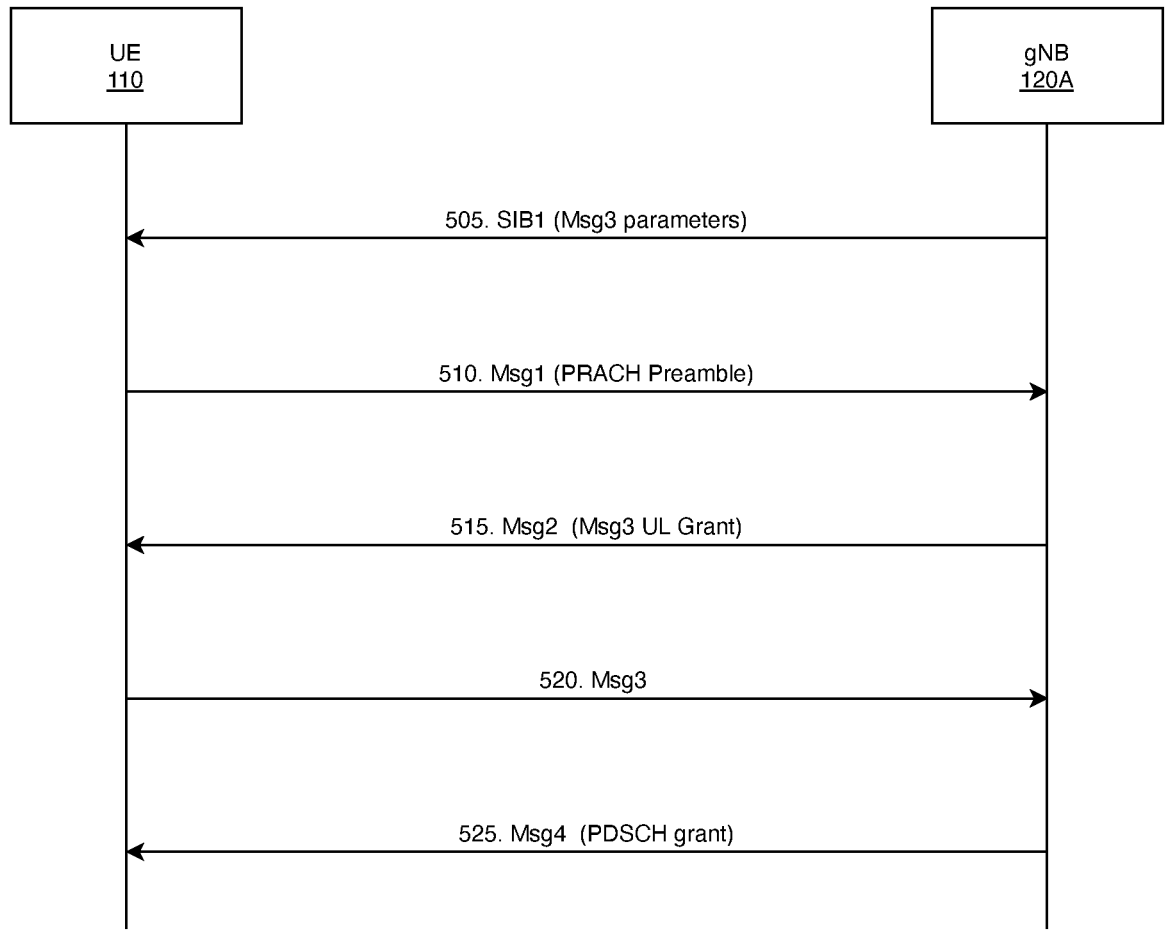
FIG. 5 shows a signaling diagram illustrating a registration procedure according to various exemplary embodiments.

FIG. 5 shows a signaling diagram 500 illustrating a registration procedure according to various exemplary embodiments. It should be noted that the signaling diagram 500 only shows transmissions that are relevant to the present disclosure and that there may be other transmissions that are part of the registration process which are not shown or described for brevity and clarity. For example, although a system information block 1 (SIB1) transmission is shown, a typical registration process includes at least a SIB2 transmission as well.

At 505, the gNB 120A transmits the SIB1 message to the UE 110. In some exemplary embodiments, the gNB 120A configures a set of Msg3 repetition numbers as discussed above. At 510, the UE transmits the Msg1 transmission containing a PRACH preamble selected by the UE 110. At 515, gNB 120A transmits the Msg2 transmission which includes the UL grant for Msg3. At 520, the UE 110 transmits the Msg3 (initial transmission or retransmission as explained above) to the gNB 120A. Once the gNB 120A decodes the Msg3 successfully, the gNB 120A transmits a Msg4 transmission containing a PDSCH grant to the UE 110.

EXAMPLES

In a first example, a user equipment (UE) comprising a transceiver configured to communicate with a network, and a processor communicatively coupled to the transceiver and configured to perform operations comprising receiving a system information block (SIB) transmission from a base station of a wireless network, receiving a downlink control information (DCI) transmission scheduling a message 2 (Msg2) transmission from the base station, receiving the Msg2 transmission including an uplink (UL) grant for a message 3 (Msg3) initial transmission from the base station, determining the number of repetitions for the Msg3 initial transmission based on at least one of the SIB transmission, the DCI transmission, and the Msg2 transmission, and determining a frequency hopping (FH) type and FH pattern based on at least one of the SIB transmission, the DCI transmission, and the Msg2 transmission.

In a second example, the UE of the first example, wherein the SIB transmission indicates configures a set of repetition numbers having a set size A, wherein a number (B) of reserved bits of the DCI transmission indicate a specific repetition number from the set, and wherein the value of B is determined by B=floor(log 2 (A)).

In a third example, the UE of the first example, wherein the SIB transmission indicates configures a set of repetition numbers, and wherein one or more bits of the Msg2 transmission indicate a specific repetition number from the set.

In a fourth example, the UE of the third example, wherein the one or more bits includes at least one of a reserved bit of a medium access control (MAC) control element (CE) of the Msg2 transmission and a predetermined number of bits of the UL grant.

In a fifth example, the UE of the fourth example, wherein a UL bandwidth part (BWP) is 20 MHz, and wherein the predetermined number of bits is 3 of 14 bits of a frequency domain resource allocation (FDRA) field of the UL grant.

In a sixth example, the UE of the fifth example, wherein when an initial UL BWP is greater than 20 MHz, the operations further comprise receiving an indication of the UL BWP of 20 MHz from the base station, wherein a resource block (RB) numbering for the initial UL BWP of a coverage-limited UE starts from a first RB of the initial UL BWP configured by the base station, and wherein a maximum number of RBs for FDRA is equal to a number of RBs associated with a BWP size limit for a coverage enhanced UE.

In a seventh example, the UE of the fifth example, wherein when an initial UL BWP is greater than 20 MHz, the operations further comprise receiving an indication of the UL BWP of 20 MHz, wherein the initial UL BWP for a coverage-limited UE is in the middle of initial BWP configured by the base station.

In an eighth example, the UE of the fourth example, wherein the predetermined number of bits are one or more bits of a modulation and coding scheme (MCS) field of the UL grant.

In a ninth example, the UE of the fourth example, wherein the predetermined number of bits are one bit of a channel state information (CSI) field of the UL grant.

In a tenth example, the UE of the fourth example, wherein the predetermined number of bits includes at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

In an eleventh example, the UE of the first example, wherein the number of repetitions is determined based on an indication by at least one of one or more reserved bits of the DCI transmission and a reserved bit of the Msg2 transmission that the UL grant should be interpreted as (i) a legacy UL grant that does not support any repetitions for the Msg3 initial transmission, or (ii) a new UL grant that supports repetitions for the Msg3 initial transmission.

In a twelfth example, the UE of the eleventh example, wherein when the at least one of the one or more reserved bits of the DCI transmission and the reserved bit of the Msg2 transmission indicates that the UL grant should be interpreted as a new UL grant, the number of repetitions, the FH type, and the FH pattern are determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, (iii) one bit of a channel state information (CSI) field of the UL grant, and (iv) one bit of a FH flag of the UL grant.

In a thirteenth example, the UE of the eleventh example, wherein when the reserved bit of the DCI transmission indicates that the UL grant should be interpreted as a new UL grant, the number of repetitions is determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

In a fourteenth example, the UE of the first example, wherein the FH type is explicitly indicated by one or more reserved bits following bits indicating the number of repetitions in the DCI transmission, and wherein a value of 1 for the one or more reserved bits indicates the FH type is inter-slot FH and a value of 0 for the one or more reserved bits indicates the FH type is intra-slot FH.

In a fifteenth example, the UE of the fourteenth example, wherein when the FH type is inter-slot FH, other ones of the one or more reserved bits indicate the FH pattern.

In a sixteenth example, the UE of the fourteenth example, wherein when the FH type is inter-slot FH, one of the SIB transmission or a reserved bit of a medium access control (MAC) control element (CE) of the Msg2 transmission indicates the FH pattern.

In a seventeenth example, the UE of the first example, wherein the FH type is explicitly indicated by a reserved bit of a medium access control (MAC) control element (CE) of the Msg2 transmission, and wherein a value of 1 for the reserved bit indicates the FH type is inter-slot FH and a value of 0 for the reserved bit indicates the FH type is intra-slot FH.

In an eighteenth example, the UE of the seventeenth example, wherein when the FH type is inter-slot FH, the SIB transmission indicates the FH pattern.

In a nineteenth example, the UE of the first example, wherein repetitions for the Msg3 initial transmission always permit FH, wherein a FH flag field of the UL grant indicates the FH type, and wherein a value of 1 for the FH flag field indicates the FH type is inter-slot FH and a value of 0 for the FH flag field indicates the FH type is intra-slot FH.

In a twentieth example, the UE of the nineteenth example, wherein the FH pattern is indicated by one of the SIB transmission or a reserved bit of a medium access control (MAC) control element (CE) of the Msg2 transmission.

In a twenty-first example, the UE of the first example, wherein repetitions for the Msg3 initial transmission always permit FH and the FH type is always one of (i) inter-slot FH, (ii) intra-slot FH, or (iii) indicated by the SIB transmission, and wherein a FH flag field of the UL grant indicates one of the number of repetitions of the Msg3 initial transmission or the FH pattern if the FH type is intra-slot FH.

In a twenty-second example, the UE of the twenty-first example, wherein when the FH type is always inter-slot FH, the FH flag indicates the FH pattern.

In a twenty-third example, the UE of the first example, wherein the operations further comprise receiving a second DCI transmission including a second UL grant for a Msg3 retransmission, determining a number of repetitions for the Msg3 retransmission, and determining a retransmission FH type and a retransmission FH pattern for the Msg3 retransmission.

In a twenty-fourth example, the UE of the twenty-third example, wherein the number of repetitions for the Msg3 retransmission, the retransmission FH type, and the FH retransmission pattern are explicitly indicated by a FH flag of the second DCI transmission and one or more reserved bits of the second DCI transmission, and wherein a value of 1 for the one or more reserved bits indicates the retransmission FH type is inter-slot FH and a value of 0 for the one or more reserved bits indicates the retransmission FH type is intra-slot FH.

In a twenty-fifth example, the UE of the twenty-third example, wherein repetitions for the Msg3 retransmission always permit FH, wherein a FH flag of the second DCI transmission indicates the retransmission FH type, and wherein a value of 1 for the FH flag field indicates the retransmission FH type is inter-slot FH and a value of 0 for the FH flag field indicates the retransmission FH type is intra-slot FH.

In a twenty-sixth example, the UE of the twenty-fifth example, wherein the retransmission FH pattern is indicated by one of the SIB transmission or a reserved bit of the second UL grant.

In a twenty-seventh example, the UE of the twenty-third example, wherein repetitions for the Msg3 retransmission always permit FH and the retransmission FH type is always one of inter-slot FH or intra-slot FH, and wherein a FH flag field of the second UL grant indicates one of the number of repetitions of the Msg3 retransmission or the retransmission FH pattern.

In a twenty-eighth example, the UE of the twenty-seventh example, wherein when the retransmission FH type is always inter-slot FH, the FH flag indicates the retransmission FH pattern.

In a twenty-ninth example, the UE of the twenty-third example, wherein repetitions for the Msg3 retransmission always permit FH, wherein the retransmission FH type is indicated by the SIB transmission, and wherein a FH flag field of the second UL grant indicates the number of repetitions of the Msg3 retransmission.

In a thirtieth example, the UE of the twenty-third example, wherein the retransmission FH type is the same as the FH type of the Msg3 initial transmission.

In a thirty-first example, the UE of the twenty-third example, wherein the retransmission FH type is opposite the FH type of the Msg3 initial transmission.

In a thirty-second example, the UE of the twenty-third example, wherein the retransmission FH is based on at least one of a random access channel (RACH) occasion (RO) and a RACH preamble used by the UE in a physical RACH (PRACH) transmission.

In a thirty-third example, a base station comprising a transceiver configured to communicate with a user equipment (UE), and a processor communicatively coupled to the transceiver and configured to perform operations comprising transmitting a system information block (SIB) transmission to a user equipment (UE), transmitting a downlink control information (DCI) transmission scheduling a message 2 (Msg2) transmission from the base station, and transmitting the Msg2 transmission including an uplink (UL) grant for a message 3 (Msg3) initial transmission from the base station, wherein the UE determines the number of repetitions for the Msg3 initial transmission based on at least one of the SIB transmission, the DCI transmission, and the Msg2 transmission, and wherein the UE determines a frequency hopping (FH) type and FH pattern based on at least one of the SIB transmission, the DCI transmission, and the Msg2 transmission.

In a thirty-fourth example, the base station of the thirty-third example, wherein the SIB transmission indicates configures a set of repetition numbers having a set size A, wherein a number (B) of reserved bits of the DCI transmission indicate a specific repetition number from the set, and wherein the value of B is determined by B=floor(log 2 (A)).

In a thirty-fifth example, the base station of the thirty-third example, wherein the SIB transmission indicates configures a set of repetition numbers, and wherein one or more bits of the Msg2 transmission indicate a specific repetition number from the set.

In a thirty-sixth example, the base station of the thirty-fifth example, wherein the one or more bits includes at least one of a reserved bit of a medium access control (MAC) control element (CE) of the Msg2 transmission and a predetermined number of bits of the UL grant.

In a thirty-seventh example, the base station of the thirty-sixth example, wherein a UL bandwidth part (BWP) is 20

MHz, and wherein the predetermined number of bits is 3 of 14 bits of a frequency domain resource allocation (FDRA) field of the UL grant.

In a thirty-eighth example, the base station of the thirty-seventh example, wherein when an initial UL BWP is greater than 20 MHz, the operations further comprise transmitting an indication of the UL BWP of 20 MHz to the UE, wherein a resource block (RB) numbering for the initial UL BWP of a coverage-limited UE starts from a first RB of the initial UL BWP configured by the base station, and wherein a maximum number of RBs for FDRA is equal to a number of RBs associated with a BWP size limit for a coverage enhanced UE.

In a thirty-ninth example, the base station of the thirty-seventh example, wherein when an initial UL BWP is greater than 20 MHz, the operations further comprise transmitting an indication of the UL BWP of 20 MHz to the UE, wherein the initial UL BWP for a coverage-limited UE is in the middle of initial BWP configured by the base station.

In fortieth example, the base station of the thirty-sixth example, wherein the predetermined number of bits are one or more bits of a modulation and coding scheme (MCS) field of the UL grant.

In a forty-first example, the base station of the thirty-sixth example, wherein the predetermined number of bits are one bit of a channel state information (CSI) field of the UL grant.

In a forty-second example, the base station of the thirty-sixth example, wherein the predetermined number of bits includes at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

In an forty-third example, the base station of the thirty-third example, wherein the number of repetitions is determined based on an indication by at least one of one or more reserved bits of the DCI transmission and a reserved bit of the Msg2 transmission that the UL grant should be interpreted as (i) a legacy UL grant that does not support any repetitions for the Msg3 initial transmission, or (ii) a new UL grant that supports repetitions for the Msg3 initial transmission.

In a forty-fourth example, the base station of the forty-third example, wherein when the at least one of the one or more reserved bits of the DCI transmission and the reserved bit of the Msg2 transmission indicates that the UL grant should be interpreted as a new UL grant, the number of repetitions, the FH type, and the FH pattern are determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, (iii) one bit of a channel state information (CSI) field of the UL grant, and (iv) one bit of a FH flag of the UL grant.

In a forty-fifth example, the base station of the forty-third example, wherein when the reserved bit of the DCI transmission indicates that the UL grant should be interpreted as a new UL grant, the number of repetitions is determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

In a forty-sixth example, the base station of the thirty-third example, wherein the FH type is explicitly indicated by one or more reserved bits following bits indicating the number of repetitions in the DCI transmission, and wherein a value of 1 for the one or more reserved bits indicates the FH type is inter-slot FH and a value of 0 for the one or more reserved bits indicates the FH type is intra-slot FH.

In a forty-seventh example, the base station of the forty-sixth example, wherein when the FH type is inter-slot FH, other ones of the one or more reserved bits indicate the FH pattern.

In a forty-eighth example, the base station of the forty-sixth example, wherein when the FH type is inter-slot FH, one of the SIB transmission or a reserved bit of a medium access control (MAC) control element (CE) of the Msg2 transmission indicates the FH pattern.

In a forty-ninth example, the base station of the thirty-third example, wherein the FH type is explicitly indicated by a reserved bit of a medium access control (MAC) control element (CE) of the Msg2 transmission, and wherein a value of 1 for the reserved bit indicates the FH type is inter-slot FH and a value of 0 for the reserved bit indicates the FH type is intra-slot FH.

In fiftieth example, the base station of the forty-ninth example, wherein when the FH type is inter-slot FH, the SIB transmission indicates the FH pattern.

In a fifty-first example, the base station of the thirty-third example, wherein repetitions for the Msg3 initial transmission always permit FH, wherein a FH flag field of the UL grant indicates the FH type, and wherein a value of 1 for the FH flag field indicates the FH type is inter-slot FH and a value of 0 for the FH flag field indicates the FH type is intra-slot FH.

In a fifty-second example, the base station of the fifty-first example, wherein the FH pattern is indicated by one of the SIB transmission or a reserved bit of a medium access control (MAC) control element (CE) of the Msg2 transmission.

In a fifty-third example, the base station of the thirty-third example, wherein repetitions for the Msg3 initial transmission always permit FH and the FH type is always one of (i) inter-slot FH, (ii) intra-slot FH, or (iii) indicated by the SIB transmission, and wherein a FH flag field of the UL grant indicates one of the number of repetitions of the Msg3 initial transmission or the FH pattern if the FH type is intra-slot FH.

In a fifty-fourth example, the base station of the fifty-third example, wherein when the FH type is always inter-slot FH, the FH flag indicates the FH pattern.

In a fifty-fifth example, the base station of the thirty-third example, wherein the operations further comprise transmitting a second DCI transmission including a second UL grant for a Msg3 retransmission to the UE, wherein the UE determines a number of repetitions for the Msg3 retransmission, and wherein the UE determines a retransmission FH type and a retransmission FH pattern for the Msg3 retransmission.

In a fifty-sixth example, the base station of the fifty-fifth example, wherein the number of repetitions for the Msg3 retransmission, the retransmission FH type, and the FH retransmission pattern are explicitly indicated by a FH flag of the second DCI transmission and one or more reserved bits of the second DCI transmission, and wherein a value of 1 for the one or more reserved bits indicates the retransmission FH type is inter-slot FH and a value of 0 for the one or more reserved bits indicates the retransmission FH type is intra-slot FH.

In a fifty-seventh example, the base station of the fifty-fifth example, wherein repetitions for the Msg3 retransmission always permit FH, wherein a FH flag of the second DCI transmission indicates the retransmission FH type, and wherein a value of 1 for the FH flag field indicates the retransmission FH type is inter-slot FH and a value of 0 for the FH flag field indicates the retransmission FH type is intra-slot FH.

In a fifty-eighth example, the base station of the fifty-seventh example, wherein the retransmission FH pattern is indicated by one of the SIB transmission or a reserved bit of the second UL grant.

In a fifty-ninth example, the base station of the fifty-fifth example, wherein repetitions for the Msg3 retransmission always permit FH and the retransmission FH type is always one of inter-slot FH or intra-slot FH, and wherein a FH flag field of the second UL grant indicates one of the number of repetitions of the Msg3 retransmission or the retransmission FH pattern.

In a sixtieth example, the base station of the fifty-ninth example, wherein when the retransmission FH type is always inter-slot FH, the FH flag indicates the retransmission FH pattern.

In a sixty-first example, the base station of the fifty-fifth example, wherein repetitions for the Msg3 retransmission always permit FH, wherein the retransmission FH type is indicated by the SIB transmission, and wherein a FH flag field of the second UL grant indicates the number of repetitions of the Msg3 retransmission.

In a sixty-second example, the base station of the fifty-fifth example, wherein the retransmission FH type is the same as the FH type of the Msg3 initial transmission.

In a sixty-third example, the base station of the fifty-fifth example, wherein the retransmission FH type is opposite the FH type of the Msg3 initial transmission.

In a sixty-fourth example, the base station of the fifty-fifth example, wherein the retransmission FH is based on at least one of a random access channel (RACH) occasion (RO) and a RACH preamble used by the UE in a physical RACH (PRACH) transmission.

In a sixty-fifth example, a processor of a base station configured to perform operations comprising transmitting a system information block (SIB) transmission to a user equipment (UE), transmitting a downlink control information (DCI) transmission scheduling a message 2 (Msg2) transmission from the base station, and transmitting the Msg2 transmission including an uplink (UL) grant for a message 3 (Msg3) initial transmission from the base station, wherein the UE determines the number of repetitions for the Msg3 initial transmission based on at least one of the SIB transmission, the DCI transmission, and the Msg2 transmission, and wherein the UE determines a frequency hopping (FH) type and FH pattern based on at least one of the SIB transmission, the DCI transmission, and the Msg2 transmission.

In a sixty-sixth example, the processor of the sixty-fifth example, wherein the SIB transmission indicates configures a set of repetition numbers having a set size A, wherein a number (B) of reserved bits of the DCI transmission indicate a specific repetition number from the set, and wherein the value of B is determined by B=floor(log 2 (A)).

In a sixty-seventh example, the processor of the sixty-fifth example, wherein the SIB transmission indicates configures a set of repetition numbers, and wherein one or more bits of the Msg2 transmission indicate a specific repetition number from the set.

In a sixty-eighth example, the processor of the sixty-seventh example, wherein the one or more bits includes at least one of a reserved bit of a medium access control (MAC) control element (CE) of the Msg2 transmission and a predetermined number of bits of the UL grant.

In a sixty-ninth example, the processor of the sixty-eighth example, wherein a UL bandwidth part (BWP) is 20 MHz, and wherein the predetermined number of bits is 3 of 14 bits of a frequency domain resource allocation (FDRA) field of the UL grant.

In a seventieth example, the processor of the sixty-ninth example, wherein when an initial UL BWP is greater than 20 MHz, the operations further comprise transmitting an indication of the UL BWP of 20 MHz from the base station, wherein a resource block (RB) numbering for the initial UL BWP of a coverage-limited UE starts from a first RB of the initial UL BWP configured by the base station, and wherein a maximum number of RBs for FDRA is equal to a number of RBs associated with a BWP size limit for a coverage enhanced UE.

In a seventy-first example, the processor of the sixty-ninth example, wherein when an initial UL BWP is greater than 20 MHz, the operations further comprise transmitting an indication of the UL BWP of 20 MHz, wherein the initial UL BWP for a coverage-limited UE is in the middle of initial BWP configured by the base station.

In a seventy-second example, the processor of the sixty-eighth example, wherein the predetermined number of bits are one or more bits of a modulation and coding scheme (MCS) field of the UL grant.

In a seventy-third example, the processor of the sixty-eighth example, wherein the predetermined number of bits are one bit of a channel state information (CSI) field of the UL grant.

In a seventy-fourth example, the processor of the sixty-eighth example, wherein the predetermined number of bits includes at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

In a seventy-fifth example, the processor of the sixty-fifth example, wherein the number of repetitions is determined based on an indication by at least one of one or more reserved bits of the DCI transmission and a reserved bit of the Msg2 transmission that the UL grant should be interpreted as (i) a legacy UL grant that does not support any repetitions for the Msg3 initial transmission, or (ii) a new UL grant that supports repetitions for the Msg3 initial transmission.

In a seventy-sixth example, the processor of the seventy-fifth example, wherein when the at least one of the one or more reserved bits of the DCI transmission and the reserved bit of the Msg2 transmission indicates that the UL grant should be interpreted as a new UL grant, the number of repetitions, the FH type, and the FH pattern are determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, (iii) one bit of a channel state information (CSI) field of the UL grant, and (iv) one bit of a FH flag of the UL grant.

In a seventy-seventh example, the processor of the seventy-fifth example, wherein when the reserved bit of the DCI transmission indicates that the UL grant should be interpreted as a new UL grant, the number of repetitions is determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

In a seventy-eighth example, the processor of the sixty-fifth example, wherein the FH type is explicitly indicated by one or more reserved bits following bits indicating the number of repetitions in the DCI transmission, and wherein a value of 1 for the one or more reserved bits indicates the FH type is inter-slot FH and a value of 0 for the one or more reserved bits indicates the FH type is intra-slot FH.

In a seventy-ninth example, the processor of the seventy-eighth example, wherein when the FH type is inter-slot FH, other ones of the one or more reserved bits indicate the FH pattern.

In an eightieth example, the processor of the seventy-eighth example, wherein when the FH type is inter-slot FH, one of the SIB transmission or a reserved bit of a medium access control (MAC) control element (CE) of the Msg2 transmission indicates the FH pattern.

In an eighty-first example, the processor of the sixty-fifth example, wherein the FH type is explicitly indicated by a reserved bit of a medium access control (MAC) control element (CE) of the Msg2 transmission, and wherein a value of 1 for the reserved bit indicates the FH type is inter-slot FH and a value of 0 for the reserved bit indicates the FH type is intra-slot FH.

In an eighty-second example, the processor of the eighty-first example, wherein when the FH type is inter-slot FH, the SIB transmission indicates the FH pattern.

In an eighty-third example, the processor of the sixty-fifth example, wherein repetitions for the Msg3 initial transmission always permit FH, wherein a FH flag field of the UL grant indicates the FH type, and wherein a value of 1 for the FH flag field indicates the FH type is inter-slot FH and a value of 0 for the FH flag field indicates the FH type is intra-slot FH.

In an eighty-fourth example, the processor of the eighty-third example, wherein the FH pattern is indicated by one of the SIB transmission or a reserved bit of a medium access control (MAC) control element (CE) of the Msg2 transmission.

In an eighty-fifth example, the processor of the sixty-fifth example, wherein repetitions for the Msg3 initial transmission always permit FH and the FH type is always one of (i) inter-slot FH, (ii) intra-slot FH, or (iii) indicated by the SIB transmission, and wherein a FH flag field of the UL grant indicates one of the number of repetitions of the Msg3 initial transmission or the FH pattern if the FH type is intra-slot FH.

In an eighty-sixth example, the processor of the eighty-fifth example, wherein when the FH type is always inter-slot FH, the FH flag indicates the FH pattern.

In an eighty-seventh example, the processor of the sixty-fifth example, wherein the operations further comprise transmitting a second DCI transmission including a second UL grant for a Msg3 retransmission, wherein the UE determines a number of repetitions for the Msg3 retransmission, and wherein the UE determines a retransmission FH type and a retransmission FH pattern for the Msg3 retransmission.

In an eighty-eighth example, the processor of the eighty-seventh example, wherein the number of repetitions for the Msg3 retransmission, the retransmission FH type, and the FH retransmission pattern are explicitly indicated by a FH flag of the second DCI transmission and one or more reserved bits of the second DCI transmission, and wherein a value of 1 for the one or more reserved bits indicates the retransmission FH type is inter-slot FH and a value of 0 for the one or more reserved bits indicates the retransmission FH type is intra-slot FH.

In an eighty-ninth example, the processor of the eighty-seventh example, wherein repetitions for the Msg3 retransmission always permit FH, wherein a FH flag of the second DCI transmission indicates the retransmission FH type, and wherein a value of 1 for the FH flag field indicates the retransmission FH type is inter-slot FH and a value of 0 for the FH flag field indicates the retransmission FH type is intra-slot FH.

In a ninetieth example, the processor of the eighty-ninth example, wherein the retransmission FH pattern is indicated by one of the SIB transmission or a reserved bit of the second UL grant.

In a ninety-first example, the processor of the eighty-seventh example, wherein repetitions for the Msg3 retransmission always permit FH and the retransmission FH type is always one of inter-slot FH or intra-slot FH, and wherein a FH flag field of the second UL grant indicates one of the number of repetitions of the Msg3 retransmission or the retransmission FH pattern.

In a ninety-second example, the processor of the ninety-first example, wherein when the retransmission FH type is always inter-slot FH, the FH flag indicates the retransmission FH pattern.

In a ninety-third example, the processor of the eighty-seventh example, wherein repetitions for the Msg3 retransmission always permit FH, wherein the retransmission FH type is indicated by the SIB transmission, and wherein a FH flag field of the second UL grant indicates the number of repetitions of the Msg3 retransmission.

In a ninety-fourth example, the processor of the eighty-seventh example, wherein the retransmission FH type is the same as the FH type of the Msg3 initial transmission.

In a ninety-fifth example, the processor of the eighty-seventh example, wherein the retransmission FH type is opposite the FH type of the Msg3 initial transmission.

In a ninety-sixth example, the processor of the eighty-seventh example, wherein the retransmission FH is based on at least one of a random access channel (RACH) occasion (RO) and a RACH preamble used by the UE in a physical RACH (PRACH) transmission.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving a system information block (SIB) transmission from a base station of a wireless network;
   receiving a downlink control information (DCI) transmission from the base station, wherein the DCI transmission is cyclic redundancy check (CRC) scrambled by a temporary cell radio network temporary identifier (RNTI);
   receiving-an uplink (UL) grant for a message 3 (Msg3) initial transmission from the base station, wherein the UL grant includes a frequency hopping (FH) flag;
   determining a number of repetitions for the Msg3 initial transmission based on at least one of the DCI transmission or the uplink grant; and
   determining a FH type and FH pattern, wherein the FH pattern is based on the FH flag of the UL grant and the FH type is explicitly indicated by one or more reserved bits following bits indicating the number of repetitions in the DCI transmission, and wherein a value of 1 for the one or more reserved bits indicates the FH type is inter-slot FH and a value of 0 for the one or more reserved bits indicates the FH type is intra-slot FH.

2. The processor of claim 1, wherein the SIB transmission indicates configures a set of repetition numbers having a set size A, wherein a number (B) of reserved bits of the DCI transmission indicate a specific repetition number from the set, and wherein a value of B is determined by B=floor(log2 (A)).

3. The processor of claim 1, wherein the SIB transmission indicates configures a set of repetition numbers, and wherein one or more bits of the DCI transmission indicate a specific repetition number from the set.

4. The processor of claim 3, wherein the one or more bits includes at least one of a reserved bit of the DCI transmission and a predetermined number of bits of the UL grant.

5. The processor of claim 4, wherein a UL bandwidth part (BWP) is 20 MHz, and wherein the predetermined number of bits is 3 of 14 bits of a frequency domain resource allocation (FDRA) field of the UL grant.

6. The processor of claim 5, wherein when an initial UL BWP is greater than 20 MHz, the operations further comprise:
   receiving an indication of the UL BWP of 20 MHz from the base station, wherein a resource block (RB) numbering for the initial UL BWP of a coverage-limited UE starts from a first RB of the initial UL BWP configured by the base station, and wherein a maximum number of RBs for FDRA is equal to a number of RBs associated with a BWP size limit for a coverage enhanced UE.

7. The processor of claim 5, wherein when an initial UL BWP is greater than 20 MHz, the operations further comprise:
   receiving an indication of the UL BWP of 20 MHz, wherein the initial UL BWP for a coverage-limited UE is in a middle of initial BWP configured by the base station.

8. The processor of claim 1, wherein the number of repetitions is determined based on an indication by at least one or more reserved bits of the DCI transmission that the UL grant is to be interpreted as (i) a legacy UL grant that does not support any repetitions for the Msg3 initial transmission, or (ii) a new UL grant that supports repetitions for the Msg3 initial transmission.

9. The processor of claim 8, wherein when the at least one or more reserved bits of the DCI transmission indicates that the UL grant is to be interpreted as a new UL grant, the number of repetitions are determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, (iii) one bit of a channel state information (CSI) field of the UL grant, and (iv) one bit of the FH flag of the UL grant.

10. The processor of claim 8, wherein when the reserved bit of the DCI transmission indicates that the UL grant is to be interpreted as a new UL grant, the number of repetitions is determined based on a plurality of UL grant bits including at least one of (i) 3 of 14 bits of a frequency domain resource allocation (FDRA) field of the UL grant, (ii) one or more bits of a modulation and coding scheme (MCS) field of the UL grant, and (iii) one bit of a channel state information (CSI) field of the UL grant.

11. The processor of claim 1, wherein repetitions for the Msg3 initial transmission always permit FH.

12. The processor of claim 1, wherein the operations further comprise:
   receiving a second DCI transmission including a second UL grant for a Msg3 retransmission.

13. The processor of claim 12, wherein repetitions for the Msg3 retransmission always permit FH.

14. A user equipment (UE), comprising:
   a transceiver configured to communicate with a network; and
   a processor communicatively coupled to the transceiver and configured to perform operations comprising:
   receiving a system information block (SIB) transmission from a base station of a wireless network;
   receiving a downlink control information (DCI) transmission from the base station, wherein the DCI transmission is cyclic redundancy check (CRC) scrambled by a temporary cell radio network temporary identifier (RNTI);
   receiving-an uplink (UL) grant for a message 3 (Msg3) initial transmission from the base station, wherein the UL grant includes a frequency hopping (FH) flag;
   determining a number of repetitions for the Msg3 initial transmission based on at least one of the DCI transmission or the uplink grant; and
   determining a FH type and FH pattern, wherein the FH pattern is based on the FH flag of the UL grant and the FH type is explicitly indicated by one or more reserved bits following bits indicating the number of repetitions in the DCI transmission, and wherein a value of 1 for the one or more reserved bits indicates the FH type is inter-slot FH and a value of 0 for the one or more reserved bits indicates the FH type is intra-slot FH.

15. The UE of claim 14, wherein the SIB transmission indicates configures a set of repetition numbers having a set size A, wherein a number (B) of reserved bits of the DCI transmission indicate a specific repetition number from the set, and wherein a value of B is determined by B=floor(log2 (A)).

16. The UE of claim 14, wherein the SIB transmission indicates configures a set of repetition numbers, and wherein one or more bits of the DCI transmission indicate a specific repetition number from the set.

17. The UE of claim 16, wherein the one or more bits includes at least one of a reserved bit of the DCI transmission and a predetermined number of bits of the UL grant.

18. The UE of claim 17, wherein a UL bandwidth part (BWP) is 20 MHz, and wherein the predetermined number of bits is 3 of 14 bits of a frequency domain resource allocation (FDRA) field of the UL grant.

19. The UE of claim 18, wherein when an initial UL BWP is greater than 20 MHz, the operations further comprise:
receiving an indication of the UL BWP of 20 MHz from the base station, wherein a resource block (RB) numbering for the initial UL BWP of a coverage-limited UE starts from a first RB of the initial UL BWP configured by the base station, and wherein a maximum number of RBs for FDRA is equal to a number of RBs associated with a BWP size limit for a coverage enhanced UE.

20. The UE of claim 18, wherein when an initial UL BWP is greater than 20 MHz, the operations further comprise:
receiving an indication of the UL BWP of 20 MHz, wherein the initial UL BWP for a coverage-limited UE is in a middle of initial BWP configured by the base station.

* * * * *